US007437410B2

(12) United States Patent
Danker et al.

(10) Patent No.: US 7,437,410 B2
(45) Date of Patent: *Oct. 14, 2008

(54) SYSTEMS AND METHODS FOR INTERFACING WITH A USER IN INSTANT MESSAGING

(75) Inventors: Daniel Danker, Hercules, CA (US); Peter Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/205,714

(22) Filed: Aug. 17, 2005

(65) Prior Publication Data

US 2005/0278427 A1      Dec. 15, 2005

Related U.S. Application Data

(63) Continuation of application No. 09/867,944, filed on May 30, 2001, now Pat. No. 6,983,305.

(51) Int. Cl.
    *G06F 15/16* (2006.01)
(52) U.S. Cl. ....................... 709/204; 715/758
(58) Field of Classification Search ................. 709/204; 715/758
    See application file for complete search history.

(56) References Cited

U.S. PATENT DOCUMENTS

| 5,828,839 | A | 10/1998 | Moncreiff |
| 6,430,602 | B1 | 8/2002 | Kay |
| 6,442,755 | B1 * | 8/2002 | Lemmons et al. ............. 725/47 |
| 6,519,771 | B1 | 2/2003 | Zenith |
| 6,584,494 | B1 | 6/2003 | Manabe |
| 6,691,162 | B1 | 2/2004 | Wick |
| 6,754,904 | B1 | 6/2004 | Cooper |
| 6,757,365 | B1 | 6/2004 | Bogard |
| 6,895,425 | B1 | 5/2005 | Kadyk |
| 2002/0173946 | A1 | 11/2002 | Christy |
| 2006/0031375 | A1 | 2/2006 | Danker et al. ............... 709/206 |

OTHER PUBLICATIONS

Michael Castelluccio E-mail in Real Time Strategic Finance Sep., 1999 pp. 34-37.
Microsoft Computer Dictionary, 5th Edition, pp. 263-264.
Notice of Allowance dated Aug. 31, 2006 cited in related U.S. Appl. No. 09/867,944 (Copy Attached).
Notice of Allowance dated Nov. 27, 2006 cited in related U.S. App. No. 11/241,036 (Copy Attached).

* cited by examiner

*Primary Examiner*—Nathan Flynn
*Assistant Examiner*—David England
(74) *Attorney, Agent, or Firm*—Workman Nydegger

(57) ABSTRACT

Reducing the amount of input required by a user to enter an electronic message. When an electronic message is received, one or more language expressions associated with the electronic message are displayed to a user. The user may select one or more of the language expressions and have the full text of all the selected language expressions included in a reply electronic message. Icons, which represent a user's capability to engage in an electronic messaging session, may also be displayed. When a user changes their capability to engage in an electronic messaging session, for instance when they go offline, a command may be sent to other users. This command may take the form of a character sequence not normally occurring in written language, which is interpreted by network devices and changes the display of the icon associated with a the user who went offline.

8 Claims, 6 Drawing Sheets

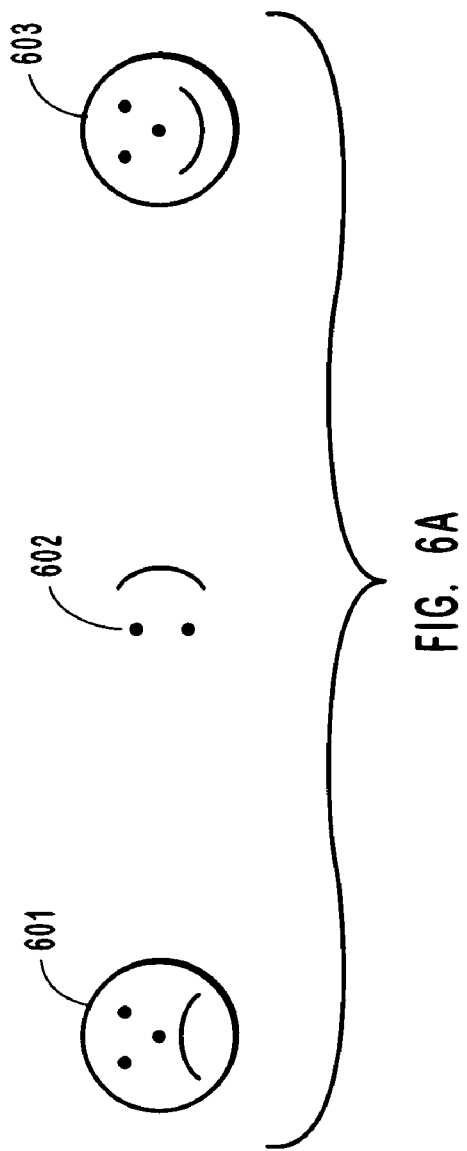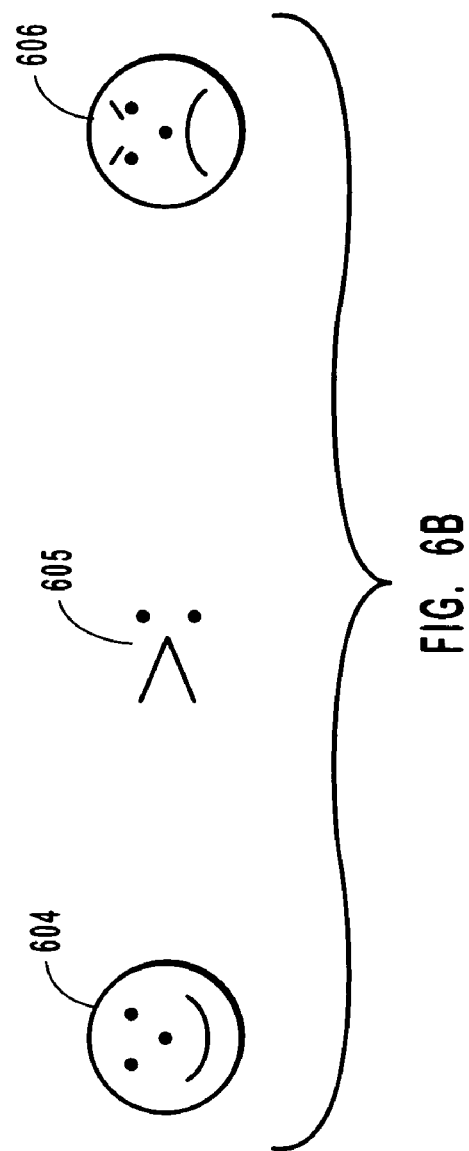

SYSTEMS AND METHODS FOR INTERFACING WITH A USER IN INSTANT MESSAGING

CROSS-REFERENCE TO RELATED APPLICATIONS

This application is a continuation of application Ser. No. 09/867,944, filed May 30, 2001, and entitled "SYSTEMS AND METHODS FOR INTERFACING WITH A USER IN INSTANT MESSAGING", and which is incorporated here by reference.

BACKGROUND OF THE INVENTION

1. The Field of the Invention

The present invention relates to the field of electronic messaging. More specifically, the present invention relates to reducing the amount of input required when generating electronic messages using a device with limited input capabilities.

2. The Related Art

The popularity of the Internet has profoundly improved the way people communicate by allowing users quick and easy access to information. By accessing the World Wide Web, electronic mail, and instant messages people now stay in touch with each other around the globe, and can access information on a virtually limitless variety of subjects. As the popularity of the Internet continues to grow, there is an increase in the number of non-conventional devices used to communicate on the Internet. Devices such as mobile phones, pagers and televisions are often used to access information on the Internet. As a result, it may be the case that two users are engaged in a messaging session where one or both of the users are not using a conventional computer system.

As well as receiving information on such devices, there is a need to efficiently input information for transmission to others. Devices such as mobile phones, pagers and televisions conventionally have input devices that lack the functionality of a computer keyboard. As a result, there is often a need to select multiple keys on a touch-tone keypad or remote control to generate a single letter of readable text.

One such method assigns multiple characters to a single key. A user selects a certain letter by pressing the same key multiple times. For instance, the "1" key on a touch-tone keypad may be assigned the letters "a," "b," and "c." To select the letter "a", the user would need to press the "1" key once, for "b" twice and for "c" three times. Such methods may also included pressing another key to shift a device from numeric mode into alphabetic mode.

Another method assigns numeric values to each letter in the alphabet. For instance, to enter the letter "c" a user might press the "0" key and then the "3" key on a television remote control. These methods may also included pressing another key to shift a device from numeric mode into alphabetic mode.

Conventional methods require a user to use multiple keystrokes to select a character, where only one keystroke would be required on a conventional computer keyboard. Additionally, users of devices employing such methods must be familiar with the associations between the numeric keys and the letters they represent. Furthermore, different devices may assign different keys to represent different letters, which further confuses users. These all lead to reduced efficiency when entering data using a limited input device.

Electronic messaging is one area where the reduced efficiency may be burdensome to a user. Some types of electronic messaging, such as instant messaging, operate in nearly real-time. A typical instant message will include multiple text characters. Entering multiple keystrokes to generate each text character may lead to delay in responding to a message. This in turn may cause recipients to wait longer when receiving an instant message as compared to a user inputting characters on a limited input device. In a nearly real-time communication environment, such delay may be unacceptable.

Accordingly, what are desired are systems, methods, and computer program products that reduce the amount of input required to enter electronic messaging data on devices with limited input capabilities.

SUMMARY OF THE INVENTION

The principles of the present invention provide for reducing the amount of input required by a user who is entering electronic messaging data with a limited input device. A network device, such as a television, is configured so that the user may engage in electronic messaging sessions, such as instant messaging. The television is associated with a network, such as a cable television network. Included on the network are other devices that are configured to engage in electronic messaging sessions. These other network devices may be televisions as well, or may be computers, pagers, cell phones, or any device capable of engaging in an electronic messaging session.

In the case of instant messaging, a user may receive an instant message, which is displayed on the video display of their television. After the message is received one or more language expressions associated with the instant message are extracted. A language expression may include any number of characters capable of being displayed on the television. For example, a language expression may be a single character or it may be a complete sentence.

Such language expressions may be extracted from the text of the instant message, from a data dictionary, or from closed caption data. The instant message and associated language expressions may be displayed simultaneously with other content, such as regular television programming. If a user is dissatisfied with the currently displayed language expressions, the user may scramble the language expressions so that new language expressions are displayed.

A user may then send a command from a remote control or other limited input device to select one of the language expressions. When a language expression is selected the entire language expression is included in a reply instant message. Since language expressions may include more than one character, a user may be able to enter text more quickly. For instance, if a language expression was a complete sentence, the user could enter the complete text of the sentence at once, reducing the amount of input required. Reducing the amount of input required in turn reduces the amount of time a user must spend to generate a reply instant message. This is especially advantageous when using a limited input device in which text entry is more time consuming.

In addition to displaying language expressions, icons associated with other instant messaging users may be displayed. These icons represent the associated user's current status. For instance, the status may indicate whether the user is online and ready to receive instant messages, offline, or online but unavailable to receive instant messages. Such icons may change when the status of the associated user changes. When a user changes status, other users receive a command, which changes the display of that user's icon. Status changes may be included as part of an instant message.

Status changes included as part of an instant message may be caused by a sequence of characters that do not typically occur in written language. When a given sequence of characters is received, instead of displaying the characters on a display, the characters are interpreted as changing the sending user's status. For example, when a user enters text often used to draw a happy face (sometimes referred to as "emoticons"), this character sequence is received and the sending users icon, which is displayed to the other users, changes to represent that emoticon.

If a message is not received because a user is offline or unavailable, the complete message may have to be re-entered at a later time. The present invention reduces the likelihood of this occurrence since users know when other users are available to engage in an instant messaging session. Preventing a user from having to re-enter a completed instant message reduces the amount of input required by the user.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates several emoticons and how such emoticons change by receiving certain characters.

DETAILED DESCRIPTION OF THE INVENTION

Figure 1:
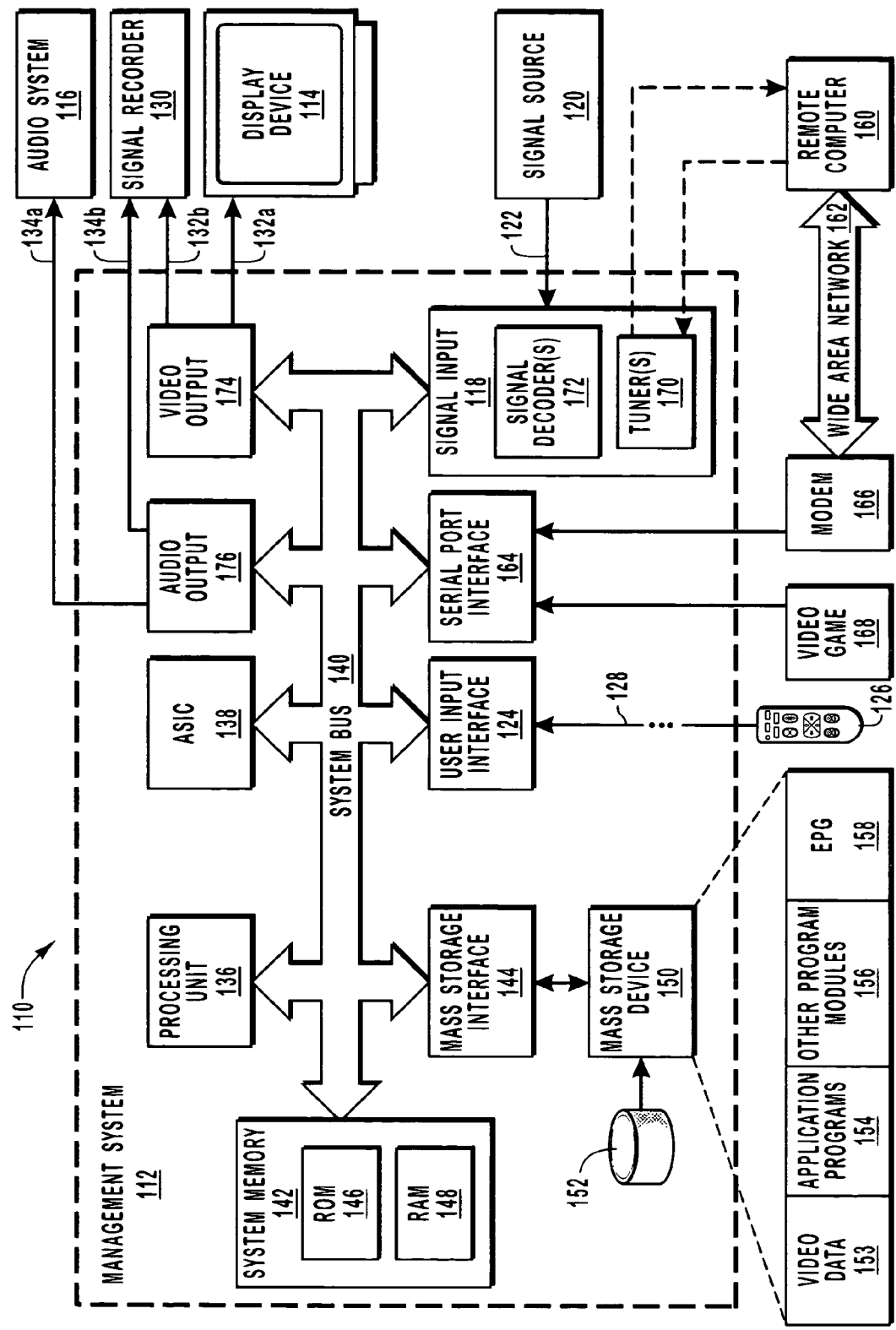
FIG. 1 illustrates an exemplary system that provides a suitable operating environment for the present invention.

The present invention extends to both methods and systems for more efficiently entering text characters using limited input devices. Language expressions are associated with an instant message when the message is received. The language expressions are displayed so that a user may select a language expression and have the language expression included in a return instant message.

In operation, when a network device receives an instant message, the network device automatically extracts one or more language expressions associated with the instant message. The associated language expressions may be extracted directly from the received instant message, from a data dictionary or from closed caption data. The network device displays the language expressions simultaneously with the received instant message. The network device then receives a user selection of one or more of the language expressions, which may come from a remote control or other limited input device. The selected language expressions are then included in a reply instant message to the received instant message.

The embodiments of the present invention may comprise a special purpose or general-purpose processing device or computer including various computer hardware components, as discussed in greater detail below. The embodiments may further comprise multiple computers linked in a networked environment. Set top boxes that enhance the capabilities of conventional televisions represent an example of a special purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium that can be used to carry or store desired program code means in the form of computer-executable instructions or data structures and that can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The invention will be described in the general context of computer-executable instructions, such as program modules, being executed by set-top boxes or other computers. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

FIG. 1 and the corresponding discussion are intended to provide a general description of a suitable environment in which the invention may be implemented. In the discussion, reference is made to a home entertainment system that may be used for displaying and/or recording programming. For purposes of this description and in the claims, a "home entertainment system" may be a display unit, such as a television screen, coupled to a processing device for performing the data processing steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, and any other device capable of processing data as described herein. Furthermore, the term "home entertainment system" is to be understood as a term that broadly describes a television-viewing environment, whether it is located in a viewer's home, at a place of business, in the public, or at any other location. Also for purposes of this description and in the claims, the term "programming" includes both the viewable and non-viewable portions of moving image data and its associated sound data.

In one embodiment, the present invention is implemented in a system that uses a conventional television screen or other display unit to display information and includes a WebTV® set-top box or a similar Internet terminal that has been adapted to perform the operations that include composing, sending and receiving email, browsing the World Wide Web ("Web"), accessing other segments of the Internet, and otherwise displaying information. An Internet terminal may use standard telephone lines, Integrated Services Digital Network (ISDN) lines, cable lines associated with cable television service, or the like to connect to the Internet or other wide area networks.

FIG. 1 illustrates a home entertainment system 110 that includes a management system 112, a display device 114 and an audio system 116. Management system 112 may be a set-top box or Internet terminal that has been adapted to perform the operations disclosed herein. Management system 112 may be integrally positioned with or separate from display device 114, which may be a high definition television display, a standard television display, a flat panel display, a projection device, a high definition television display, a computer monitor, or any other device capable of displaying viewable video image data. Audio system 116 may be a speaker, a stereo system, or any device capable of emitting sound data, and similarly may be integrally positioned with or separate from display device 114.

Management system 112 includes a signal input 118, which receives programming from a signal source 120. The programming is transmitted from signal source 120 to signal input 118 via a programming input line 122, which can be a cable or optic connection, a terrestrial antenna system, a satellite system, or any device or system capable of transmitting programming to management system 112.

The signal source 120 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF or VHF), and the like.

While FIG. 1 illustrates home entertainment system 110 as having a single programming input line 122 and a single signal source 120, there may also be a plurality of programming input lines that transmit programming from a plurality of signal sources. In such embodiments, the home entertainment system may receive the programming from one signal source or from a plurality of signal sources at a time.

Management system 112 also includes a user input interface 124, which receives input from an input device 126, such as a remote control, external special purpose or general-purpose processing device or computer, keyboard, microphone, mouse, or any other device capable of generating electronic instructions for management system 112. Input device 126 is communicatively coupled to management system 112 over an input link 128 so as to enable such control. Input device 126 generates electronic instructions over input link 128 in response to preprogrammed data or in response to a viewer pressing buttons on input device 126. Input device 126 may also control Web browser software within management system 112 as when management system 112 is a set-top box or an Internet terminal that has been adapted to perform the operations disclosed herein. For instance, input device 126 may be programmed to turn on home entertainment system 110 and to tune management system 112 to a channel.

FIG. 1 illustrates a signal recorder 130, which is capable of receiving video and/or audio data and recording the data on a storage medium. Video signals are transmitted to display device 114 and/or signal recorder 130 by video image links 132a and 132b respectively, examples of which include a radio-frequency ("RF") link, an S-video link, a composite link, or any other equivalent form of video image link. Similarly, audio links 134a and 134b transmit audio data from management system 112 to audio system 116 and/or to signal recorder 130.

The operation of management system 112 is controlled by a central processing unit ("CPU"), illustrated as processing unit 136, which is coupled to an application-specific integrated circuit ("ASIC") 138 via system bus 140 and uses computer-executable instructions implemented in software and/or hardwired logic circuitry. Processing unit 136 and ASIC 138 are also coupled via a system bus 140 to various other system components, including system memory 142, mass storage interface 144, user interface 124 and signal input 118. Processing unit 136 may execute software designed to implement features of management system 112 including features of the present invention.

ASIC 138 includes circuitry that is used to implement certain functions of management system 112. Instructions, data, and other program modules necessary for the operation of processing unit 136 and necessary for the operation of the ASIC 138 may be stored in mass storage device 150 and/or system memory 142, which includes read-only memory ("ROM") 146 and random-access memory ("RAM") 148. System memory 142 is coupled to system bus 140 and mass storage device 150 is coupled to mass storage interface 144, which is in turn also coupled to system bus 140. Thus, ROM 146, RAM 148 and mass storage device 150 are communicatively coupled to ASIC 138 so as to be readable by ASIC 138 and so that data may be written from ASIC 138 to RAM 148 and to mass storage device 150. Mass storage device 150 may be a magnetic hard disk 152, but may also be any of the other computer-readable media referenced above.

Any desired computer-readable instructions or data, including application programs 154, other program modules 156, and an electronic programming guide ("EPG") 158, which specifies the broadcast times and channels of programs can be stored in mass storage device 150.

Mass storage device 150 may also be used to record video data 153, in which case, management system 112 performs the functions of a digital video recorder. Digital video data may be received by home entertainment system 110 from a variety of sources including signal source 120, remote computer 160, video game 168, input device 126 and the Internet.

EPG data may be obtained in a variety of manners. For instance, the EPG data can be supplied to management system 112 by a remote computer 160, such as a server, or from devices on the Internet and stored on mass storage device 150. The EPG data may be supplied on a regular basis to continually maintain a current schedule of programming at the management system 112. Alternatively, the EPG may be delivered to home entertainment system 110 by using a direct-dial communication over standard telephone lines, or by using data transmission over the cable television infrastructure, a satellite network, an over-the-air broadcasting or any other available medium, including those previously mentioned.

In the embodiment where management system 112 is associated with the Internet, management system 112 may communicate with remote computer 160 via wide area network ("WAN") 162 using a variety of techniques, including interposing serial port interface 164 between the system bus 140 and modem 166, using a wireless link, or other means for establishing communications over a WAN that may be internal or external to management system 112. Management device 112 is also capable of transmitting information via the Internet by direct-dial communication over standard telephone lines, or by using any other available communication medium.

While serial port interface 164 may be utilized to connect modem 166 for communicating across a WAN, serial port interface may also be utilized to connect other consumer electronic devices, such as video game 168, and/or various input devices, such as a keyboard (not shown) or joystick (not shown), to management device 112.

Referring now to signal input 118, if the signal on programming input line 122 includes multiple channels, a tuner 170 included in signal input 118 tunes to a selected channel in the signal. Multiple tuners 170 can be used to provide enhanced viewing features, such as picture-in-picture, recording one channel while viewing another, and recording a plurality of channels simultaneously. A signal decoder 172 may convert video data from an analog format to a digital format, from a digital format to an analog format, or convent between varying digital formats, in the event that ASIC 138 and tuner 170 employ different formats. Signal decoder 172 may also decode video data from a compressed video format (e.g. MPEG). In embodiments where the management system 112 includes multiple tuners 170, management system 112 may also include multiple signal decoders 172 to perform the operations disclosed herein.

Management system 112 may also include video output 174, which may include a video encoder and/or a video converter. The video encoder assigns a code to frames of video data that are transmitted across video image links 132a and 132b and switches between analog and digital formats as necessary. Similarly, audio output 176 can include an audio converter to provide the necessary switching between analog and digital formats across audio links 134a and 134b.

In this description and in the following claims, the term limited input device, refers to any input device that may require more key selections than a standard computer keyboard to enter a character of text. Examples of such devices are remote controls and telephone touch pads.

In this description and in the following claims, the term language expression refers to one or more text characters that when viewed have meaning to the viewer. There is no limit on the number of text characters that may be included in a language expression. For example, a language expression may be a word, a complete sentence or a complete paragraph of text.

In the following description, the practice of the present invention is discussed in reference to instant messages. However, it should be understand that the present invention may be practiced with any type of electronic messaging, such as electronic mail and the like.

Figure 2:
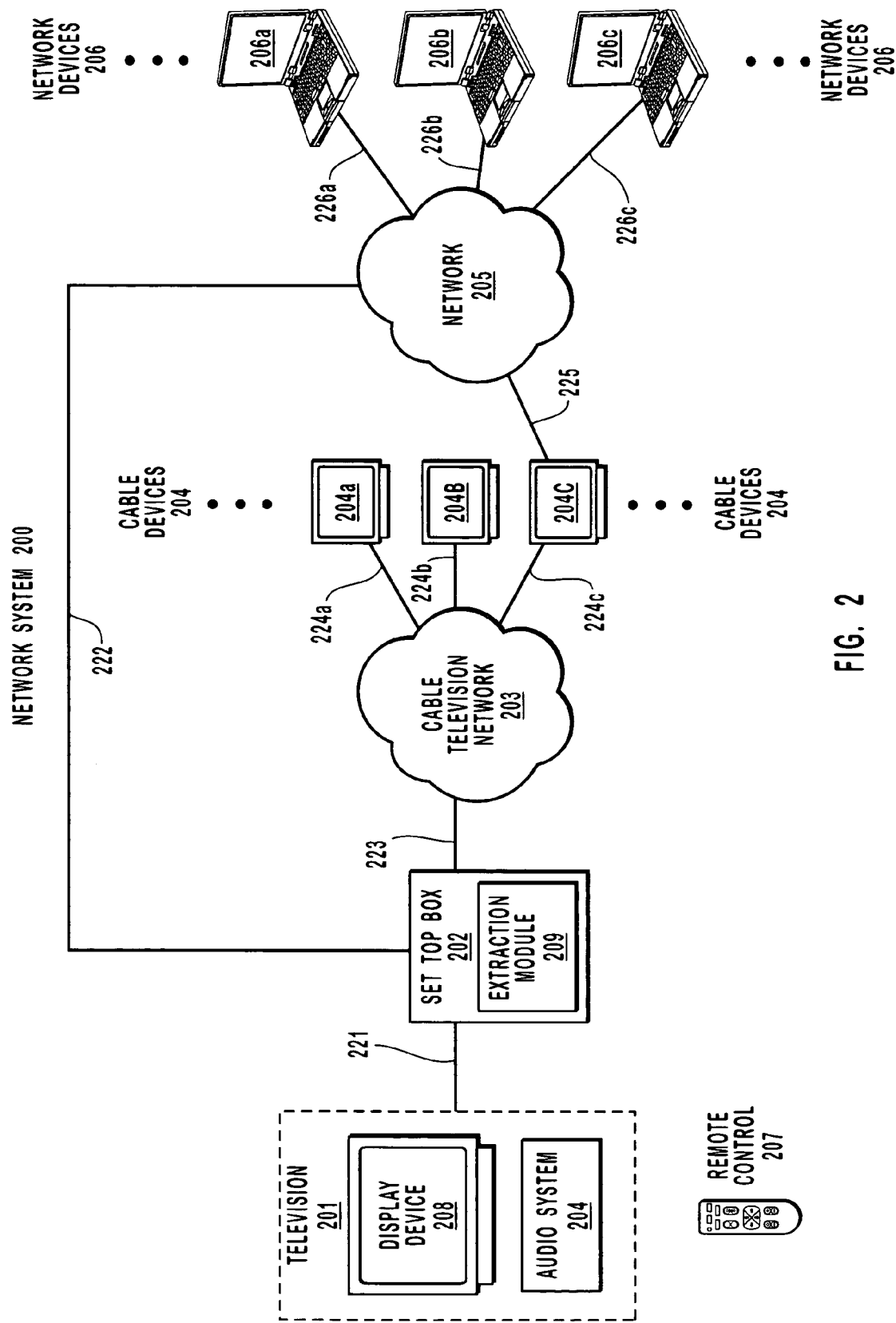
FIG. 2 illustrates some of the functional components present in a system where the input required to enter an instant message is reduced.

While FIG. 1 and the corresponding discussion above provide a general description of a suitable environment in which the invention may be implemented, it will be appreciated that the features of the present invention disclosed herein may be practiced in association with a variety of different system configurations. This is true of the functional components included in FIG. 2 as well. The functional components included in FIG. 2 illustrate only one example of the practice of the invention. It should be understood that the invention, as embodied in FIG. 2, might also be practiced in a configuration that additionally includes one or more of the components as illustrated in FIG. 1.

FIG. 2 illustrates a network system 200 suitable for implementing the principles of the present invention. The network system 200 includes television 201, set top box 202, cable television network 203, network 205, and remote control 207. Cable television network 203 and network 205 may be associated with one or more devices such as cable devices 204 and one or more network devices 206. Television 201 includes display device 208 and audio system 204. Set top box 202 may be, for example, management system 112 as described in FIG. 1. The components of network system 200 mentioned above work together to implement the principles of the present invention.

Figure 3:
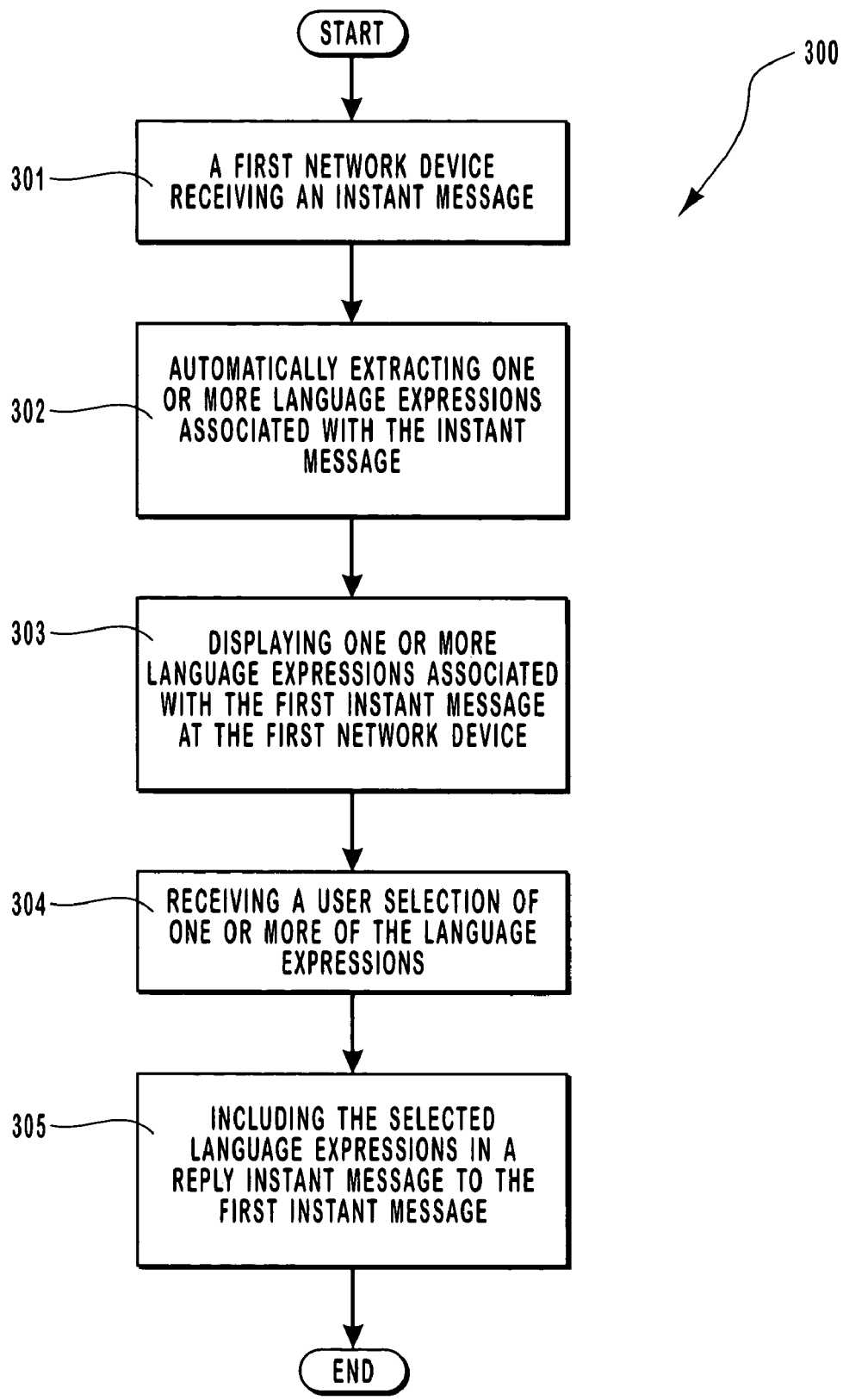
FIG. 3 is a flow diagram illustrating a method whereby the input required to enter an instant message is reduced.

FIG. 3 illustrates a method 300 that allows the user of television 201 to reduce the amount of input required when engaging in an instant messaging session. The method of FIG. 3 will be described in the context of the network system illustrated in FIG. 2. Thus, elements of both FIGS. 2 and 3 will be referred to frequently in describing the operation of the present invention. The functionality of each of the components of FIG. 2 will become clear from the following description relating to both FIG. 2 and FIG. 3.

In operation, set top box 202 receives an instant message (act 301). The instant message may have originated from one of cable devices 204 or network devices 206. Network 205 may be any type of network, including the Internet, which provides a medium for network devices 206 to engage in instant messaging sessions. Network devices 206 may include computers, cell phones, pagers, or any other device that may be communicatively coupled to network 205 so as to engage in an instant messaging session. Cable television network 203 is a television network that may provide television programming, broadband services or a combination of both television programming and broadband services to associated devices. For instance, device 204a may be a standard cable television, which receives television programming. On the other hand, network device 204b may be a computer that includes a cable modem. It may also be the case that devices included in cable devices 204 are communicatively coupled to cable television network 203 and network 205 simultaneously. Network device 204c is an example of such a device.

Set top box 202 is also associated with both cable television network 203 over communication coupling 223. The set top box 202 is also associated with network 205 over communication coupling 222. Set top box 202 may communicate with network 205 using any of the techniques described in relation to wide area network 162 from FIG. 1, including communication via the Internet over standard telephone lines. Likewise, set top box 202 may communicate with cable television system 203, using any of the techniques described in relation to input line 122 from FIG. 1. The invention may be practiced when an instant message is received from any of the above mentioned devices and may be practiced when an instant message is received using any of the above mentioned communications techniques.

After receiving an instant message (act 301), set top box 202 automatically extracts one or more language expressions associated with the instant message (act 302). Language expressions may be extracted using a program module, such as extraction module 209. Extraction module 209 may be included in application programs 154 or other program modules 156, as illustrated in FIG. 1. Extraction module 209 may be stored in different memory locations including system memory 142 or mass storage device 150, as illustrated in FIG. 1. Extraction module 209 is just one example of how to extract language expressions. Any other software or hardware module that searches text to find a particular series of characters will work as well.

The language expressions may be extracted from a variety of different sources. Extraction module 209 may simply extract words directly from the received instant message. Extraction module 209 may also extract language expressions from a data dictionary, which includes language expressions from previously received instant messages, language expressions input by a user, downloaded language expressions, or language expressions received in some other manner by set top box 202. Additionally, since set top box 202 receives television programming via communications coupling 223, extraction module 209 may extract language expressions from closed caption data.

Extraction module 209 may use a variety of different techniques to select which language expression will be extracted. Extraction module 209 may randomly select language expressions from any of the above sources. However, extraction module 209 may access previously stored word associations from one of the storage locations associated with set top box 202.

It may also be that one or more of the selection techniques are integrated in order to access language expressions stored in multiple memory locations. In one alternative embodiment, a data dictionary includes one or more word associations. When an instant message is received, extraction module 209 may scan the data dictionary for each language expression received in the instant message. Extraction module 209 may then select language expressions received in the instant message and/or language expressions in the data dictionary for extraction. Alternately, extraction module 209 may access previous word associations when scanning for language expressions in closed caption data.

In another alternative embodiment, set top box 202 may temporarily buffer the closed caption data in associated memory locations. When an instant message is received, extraction module 209 scans the buffered closed caption data for language expressions associated with the received instant message. Since set top box 202 may process instant messages and television programming simultaneously, this embodiment is especially useful for engaging in an instant messaging session discussing television programming.

After extracting language expressions (act 302), one or more language expressions associated with the received instant message are displayed (act 303). This may involve set top box 202 transmitting the language expressions to television 201 over communications coupling 221. Television 201 receives the language expressions for display on display device 208. Communications coupling 221 may simply carry video data similar to video image link 132a from FIG. 1. However, communications coupling 221 may be an integrated link including the functionality of audio link 134a and carrying video data and audio data simultaneously.

Once the language expressions are displayed (act 303), set top box 202 receives a user selection of one or more of the language expressions (act 304). The selection may be received from a limited input device, such as remote control 207. If a user is not satisfied with the displayed language expressions, a command may be given to display a new set of language expressions. In one embodiment, selecting and extracting a new set of language expressions by repeating act 303 may do this.

In another embodiment, multiple sets of language expressions may be selected and extracted in act 303. However, only one set of language expressions is displayed, the rest being buffered in one of the memory locations included in set top box 202. When a command is received to display a new set of language expressions, one of the buffered sets of languages expressions is retrieved and displayed.

After one or more of the language expressions are selected (act 304), the language expressions are included in a reply instant message to the received instant message (act 305).

Since language expressions may include more then one character and multiple language expressions may be selected at once, the input required to include such language expressions is reduced. This is particularly advantageous on devices with limited input capabilities, such as a television remote control, which may require multiple key selections to enter one character of text. Also, since displayed language expressions are extracted based on the contents of a received instant message there is an increased chance they will be used in a reply message. However, if a user wishes to replace the current language expressions with new language expressions, they may do so.

Instant messaging users may also manually enter a word or phrase using an on-screen keyboard or other manual-entry interface requiring users to enter words letter-by-letter. Once such words or phrases are entered, they too are added to the buffer, where they can later appear as the user selects words.

Figure 4:
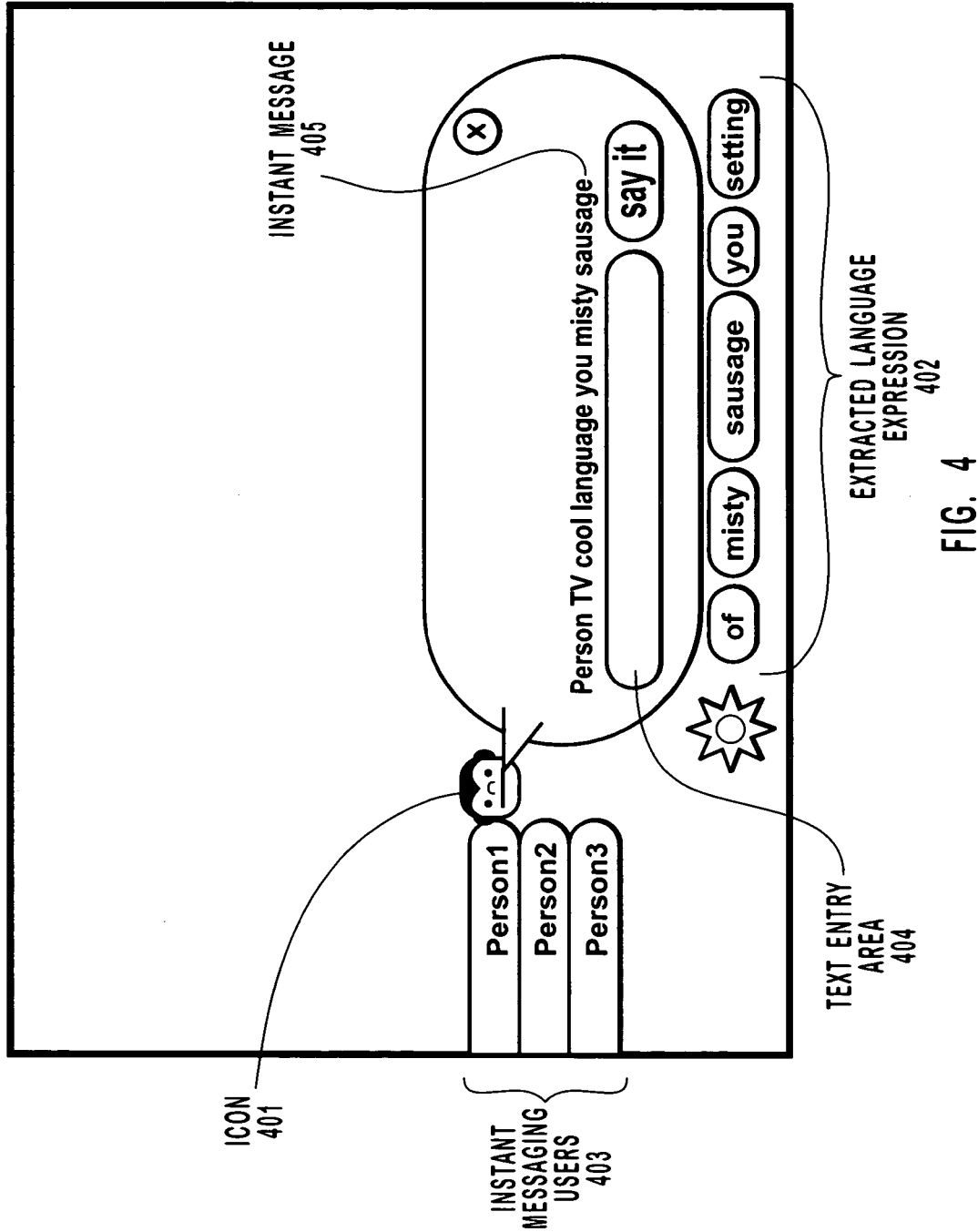
FIG. 4 illustrates an example of a user interface where the input required to enter an instant message is reduced.

FIG. 4 illustrates one example of an instant messaging user interface as illustrated on a display 400. Included in display 400 are extracted language expressions 402, which are displayed in response to receiving instant message 405. A user may select language expressions included in extracted language expressions 402 by manipulating keys on a remote control or other limited input device. One example of this type of manipulation is pressing arrow keys on a remote control to move between language expressions and then pressing a select key to select a particular language expression. When one or more of the language expressions is selected, another command may be received and the language expressions are entered in text entry area 404.

Also included in display 400 are instant messaging users 403, which include all the instant messaging users that may be contacted by the user of display 400. In this case, instant messaging users 403 includes Person1, Person 2, and Person3. An individual user may be selected in a manner similar to selecting a language expression.

Associated with instant messaging users 403 is icon 401. In display 400, icon 401 is used to represent the current state of Person1. Person1 may change the appearance of icon 401, and thus their current state, by sending a command to the network device associated with display 400. For instance, Person1 may change the appearance of icon 401 when going offline or when Person1 is not able to receive instant messages. Commands for changing the appearance of icons, such as icon 401 may be included in instant messages.

Figure 5:
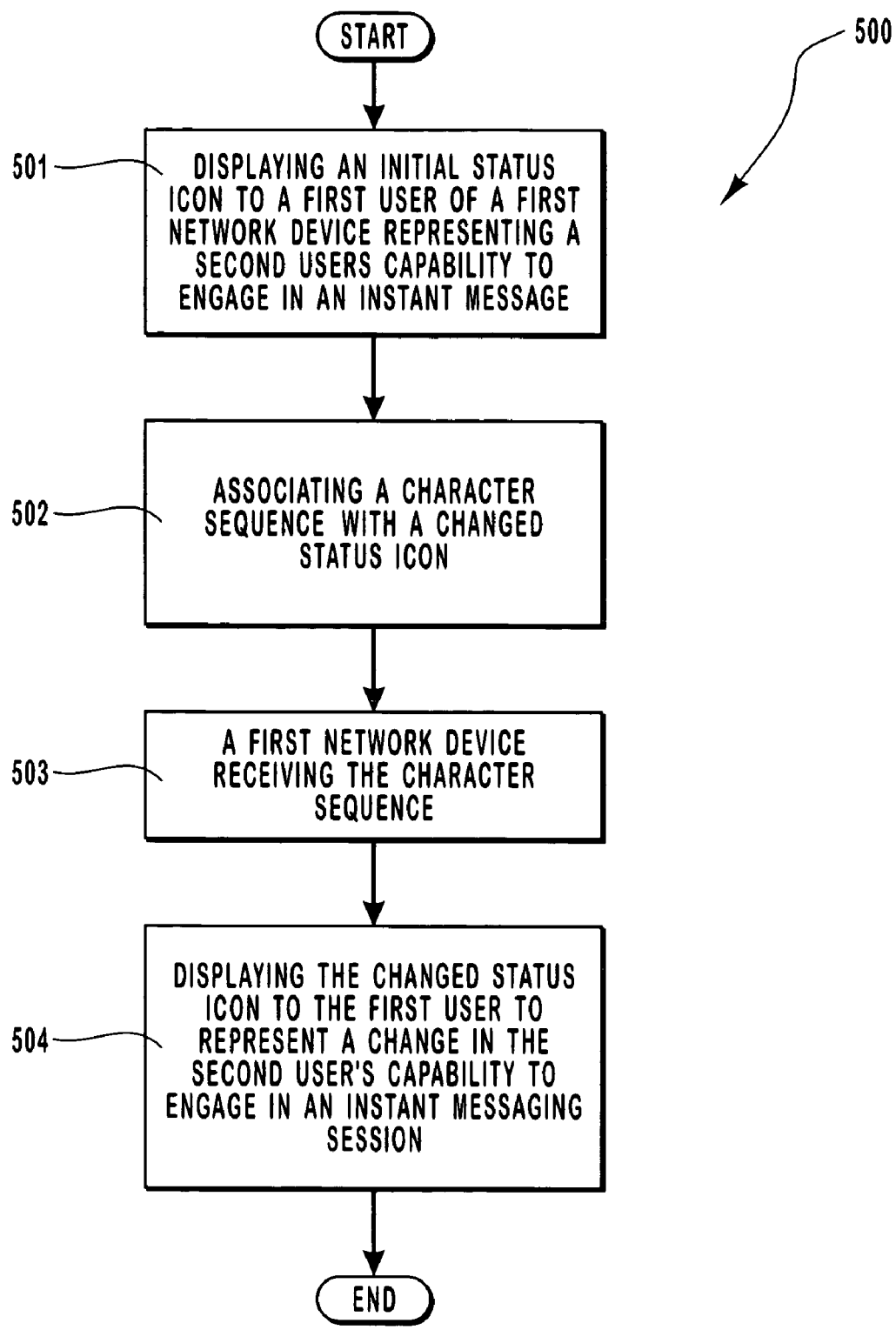
FIG. 5 is a flow diagram illustrating a method whereby a first user is made aware of a change in a second user's capability to engage in an instant messaging session.

FIG. 5 illustrates a method for changing the appearance of an icon associated with an instant messaging user. The method begins by displaying an initial status icon to a first user of a first network device, which represents a second user's capability to engage in an instant messaging session (act 501). In FIG. 4, icon 401 represents Person1's capability to engage in an instant messaging session. The appearance of icon 401 is not important, as long as the user of display 400 is aware of the meaning of the displayed icon.

A character sequence is associated with a changed status icon (act 502). A character sequence may include one or more hidden characters, may include characters from a previously entered text string, and may be a character sequence not normally occurring in written language, which when viewed would have little if any meaning to the viewer. For instance, the sequence "!!)" may represent a user is offline. If "!!)" were viewed, a viewer would get little meaningful information from the character sequence. Similarly, recognized character sequences that are sometimes referred to as "emoticons" may also change the status icon to represent the user's state.

FIGS. 6A and 6B show examples of how an initial status icon may change after receiving a character sequence associated with a changed status icon. In FIG. 6A, a user associated with initial status icon 601 is represented as frowning. A network device associated the user may receive character sequence 602 ":)", resulting in changed status icon 603 which represents that the user associated with changed status icon is smiling. In FIG. 6A, a network device associated with a user receives character sequence 603 ">:". Character sequence 605 changes initial status icon 604 to changed status icon 606 representing that the user associated with changed status icon 606 is mad.

When network device receives such a character sequence (act 503), a changed status icon is displayed to the first user to represent a change in the second users capability to engage in an instant messing session (act 504). The character sequence may be sent as an individual command or included in an instant message. When the character sequence is included in an instant message, the network device associated with display 400 processes the character sequence to change the icon. In one embodiment, the network device associated with display 400 may strip the character sequence from the instant message before displaying the contents of the instant message.

Displaying an icon to represent a user's state may prevent instant messages from being sent to a user who is not capable of engaging in an instant messaging session. An instant message that is sent to a user who is not capable of engaging in an instant messaging session may need to be completely reentered at a later time. On a device with limited input capabilities, this may require extensive data input. By displaying a status icon, the chance of needing to completely reenter an instant message is reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a network system including at least two network devices network connectable so as to be capable of performing electronic mail operations, one of the at least two network devices being a television, a method for users of the at least two network devices to communicate via electronic mail, the method reducing the amount of input required by the users, the method comprising:

a first network device receiving a first electronic mail message;

automatically, and without user intervention, extracting one or more language expressions associated with the first electronic mail message;

displaying one or more language expressions associated with the first electronic mail message at the first network device;

receiving a user selection of one or more of the language expressions displayed at the first network device; and including the selected language expressions in a reply electronic mail message to the first electronic mail message.

2. The method as recited in claim 1, wherein receiving a first electronic mail message on a first network device comprises the following:

a television set top box receiving a first electronic mail message.

3. The method as recited in claim 1, wherein displaying one or more language expressions associated with the first electronic mail message at the first network device comprises the following:

displaying one or more language expressions associated with the first electronic mail message on a video display associated with a television.

4. The method as recited in claim 1, wherein receiving a user selection of one or more of the language expressions displayed at the first network device comprises the following:

receiving a user selection of one or more language expressions displayed on a video display associated with a television.

5. The method of claim 1, wherein extracting one or more language expressions associated with the first electronic mail message is performed in combination with extracting at least one language expression from another source.

6. The method as recited in claim 5, wherein said another source is provided user input.

7. The method as recited in claim 5, wherein said another source is a downloaded expression.

8. The method as recited in claim 5, wherein said another source is a previous message.

* * * * *